G. P. ALTENBERG.
CUP AND RELEASABLE HANDLE THEREFOR.
APPLICATION FILED JUNE 15, 1917.
1,338,480. Patented Apr. 27, 1920.
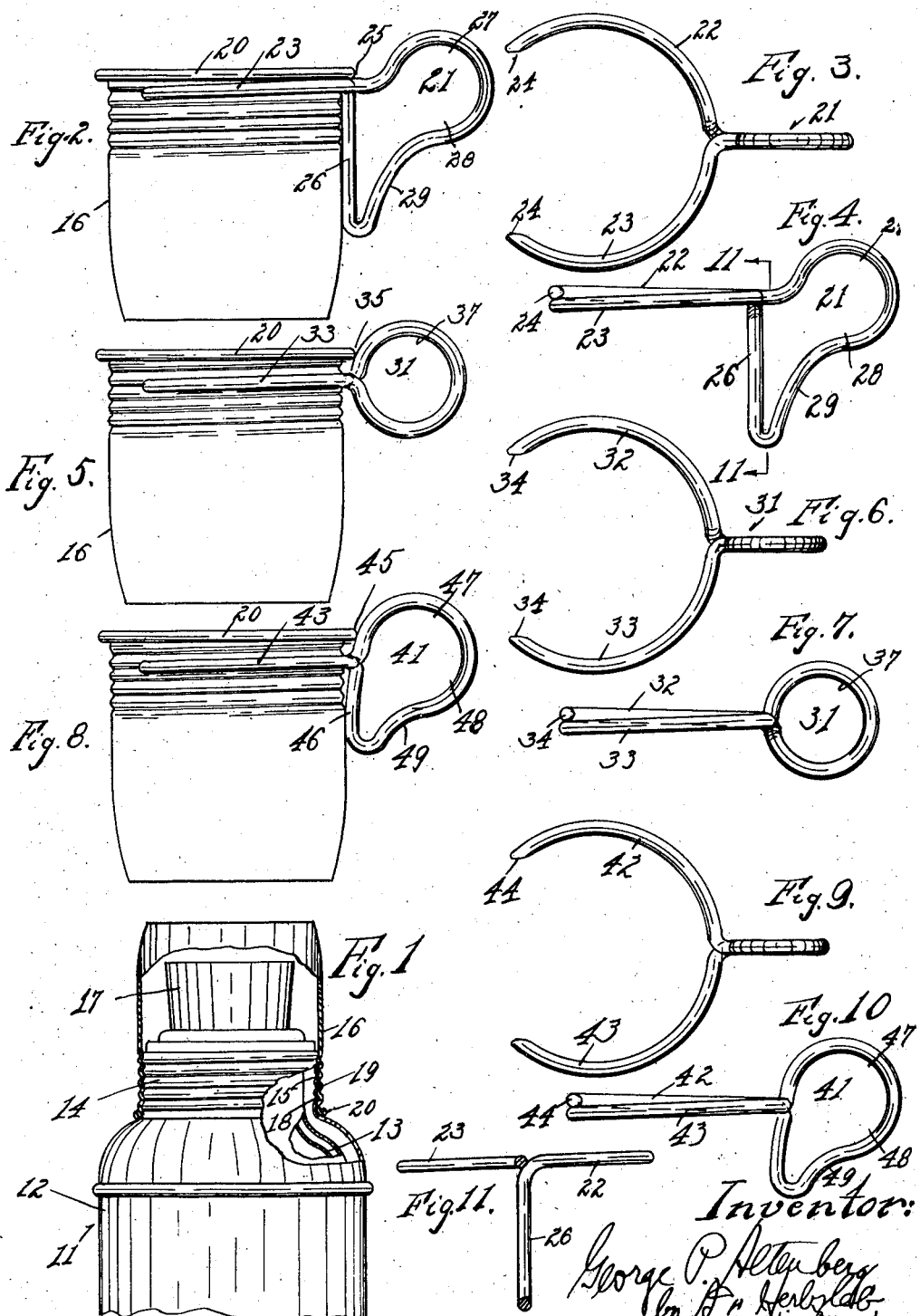

UNITED STATES PATENT OFFICE.

GEORGE P. ALTENBERG, OF CINCINNATI, OHIO, ASSIGNOR TO THE ICY-HOT BOTTLE COMPANY, OF CINCINNATI, OHIO, A CORPORATION OF WEST VIRGINIA.

CUP AND RELEASABLE HANDLE THEREFOR.

1,338,480.      Specification of Letters Patent.      Patented Apr. 27, 1920.

Application filed June 15, 1917. Serial No. 174,937.

*To all whom it may concern:*

Be it known that I, GEORGE P. ALTENBERG, a citizen of the United States, residing at Cincinnati, in the county of Hamilton and State of Ohio, have invented certain new and useful Improvements in Cups and Releasable Handles Therefor, of which the following is a specification.

It is the object of my invention to provide a new and improved cup handle of novel construction, arranged to be releasably received about the caps of vacuum insulated vessels which serve as cups.

In the drawings:

Figure 1 represents a side elevation of a vacuum insulated vessel, partly broken away, the casing of which is provided with a cap.

Fig. 2 is a side elevation showing the cap detached and inverted for use as a cup, with my improved handle attached thereto.

Fig. 3 is a plan view of the handle.

Fig. 4 is a side elevation of the handle.

Fig. 5 is a side elevation of the cap detached and inverted for use as a cup, having a handle of modified form releasably secured thereto.

Fig. 6 is a plan view of the latter handle.

Fig. 7 is a side elevation of the same.

Fig. 8 is a side elevation of the cap detached and inverted for use as a cup, having a further modification of the handle releasably secured thereto.

Fig. 9 is a plan view of said handle.

Fig. 10 is a side elevation of the same.

Fig. 11 is a detail section on the line 11—11 of Fig. 4.

The vessel is instanced at 11 and comprises a casing 12, usually of metal, in which a usual double-walled vacuum-insulated glass container 13 is received. The neck 14 of the casing is screw-threaded, as shown at 15. 16 is a cap for the casing arranged to be received over the stopper 17 of the vessel and is instanced as formed in inverted cup-form and provided with threads, shown as rolled threads rolled into the sheet-metal of the cap and forming inner threads 18 which coact with the threads 15 of the mouth of the vessel for screwing the cap to the vessel, and with outer threads 19. The mouth of the cup is exemplified as provided with a turned-over bead 20.

When the cap is removed from the vessel, it is adapted to be inverted to form a cup into which the contents of the vessel may be poured for drinking the same. The contents may be of any temperature and if very hot the heat of the contents is immediately transferred to the metal of the cup, making it disagreeable for a person to hold by grasping the cup. In order to overcome these objections and also provide a handle which will not interfere with the use of the cup as a cap, or with cups which may be nested one within the other in the outer cap, I provide a handle of simple form which is detachable from the cup.

This handle is preferably bent up from a single piece of wire, preferably spring wire, the central portion of the wire forming a grasping portion 21 of the handle, and the ends of the wire being bent bow-like for being received about the cup, the bow-like bent stretches 22, 23, together being received about more than half the circumference of the cup. The grasping portion is that portion of the handle which is grasped by the thumb and fingers of the user when using the cup. These bow-like stretches are preferably resilient and the stretch of the wire forming the grasping portion of the handle also preferably forms a resilient stretch for resiliently holding the bowed stretches of the handle toward one another. The proximate ends of these bowed stretches are preferably free to move with relation to each other, the resiliency of the stretch of the grasping portion of the handle being such as to maintain said proximate ends normally in proximate relation.

The bowed stretches of the handle are preferably arranged along the line of a spiral with relation to the grasping stretch of the handle for readily resting in an outer groove of the outer thread of the cup.

The handle is readily attached to the cup by presenting the extremities 24 of the bowed stretches to the cup and exerting pressure between the cup and handle, one toward the other, whereby the bowed stretches are snapped around the cup and grasp the cup for a greater distance than half the circumference of the cup, whereby the handle is securely held to the drinking cup for drinking purposes.

In the form of handle shown in Figs. 2, 3 and 4, the inner portion of the upper end of the grasping portion preferably rests against the annular bead 20 at the mouth of the cup, as shown at 25, the grasping portion having a depending stretch 26 arranged to rest in up and down relation against the side of the cup, whereby the cup is securely held to the handle by the resilient bow-stretches of the handle, and the resting portions of the handle coact with the bead and with the side of the cup.

The grasping portion of the handle comprises an upwardly extending portion 27 which extends above the horizontal plane of the bowed stretches when in position of use, and a depending portion 28 which extends below the horizontal plane of the bowed stretches, comprising an outer inwardly bent stretch 29 merging with the upward extension 27 and forming an ogee curve therewith, the depending portion also comprising the depending stretch 26.

In the modification exemplified in Figs. 5, 6 and 7, similar portions of the handle are designated by similar reference numerals raised to the series 30. The grasping portion of the handle is shown as of ring form, the upwardly extending stretch 37 of the ring resting against the bead at the mouth of the cup, as shown at 35, for aiding in maintaining proper relation between the cup and handle.

In the modification shown in Figs. 8, 9 and 10, similar portions of the handle are designated by similar reference numerals raised to the series 40. The upwardly extending portion 47 extends directly from the bowed stretch 42 of the handle, the upwardly extending stretch of said bowed portion resting against the outer edge of the bead at the mouth of the cup, as shown at 45, and the depending stretch 46 resting against the outer face of the cup.

My improved handle is simple, and made at small cost, and provides a firm hold upon the cup at both sides of the grasping portion, and equally distributes the load for readily and conveniently grasping and holding the handle and cup.

Having thus fully described my invention, what I claim as new and desire to secure by Letters Patent, is:

1. A releasable handle for the inverted cap of a heat-insulated vessel forming a cup, which consists of a resilient wire of uniform cross-section bent to form a single median resilient grasping portion arranged to extend lengthwise of the axis of said cup, and bow-like stretches extending laterally outward from the respective sides of said grasping portion and arranged to be resiliently received about the cup, the said resilient grasping portion acting resiliently on said bow-like stretches to aid by its resilience in holding the cup.

2. In combination with the inverted cap of a heat-insulated vessel forming a cup, a releasable handle formed of spring wire of uniform cross-section, the median portion of said wire bent into the form of a grasping part and a portion at each side of said grasping part bent to extend laterally outward therefrom, said grasping portion located in a middle position between said stretches, said stretches forming bow-stretches received about the cup at the respective sides of said grasping part collectively for a distance greater than half the circumference of the cup.

3. In combination with the inverted cap of a heat-insulated vessel used as a cup, a releasable handle of wire of uniform cross-section bent to form a grasping portion and stretches extending laterally outward from the respective sides of said grasping portion, said grasping portion located in a middle position between said stretches, said stretches received about said cup for a greater distance than one-half the circumference thereof, said grasping portion comprising a stretch of said wire extending lengthwise of said cup below said first-named stretches and arranged to be contacted by said cup for being supported thereby.

4. In combination with the inverted cap of a heat-insulated vessel used as a cup and provided with a bead at the mouth of said cup, a releasable handle of wire bent to form a grasping portion and bowed stretches extending laterally outward from both sides of said grasping portion, said bowed stretches received about said cup for a greater distance than one-half the circumference thereof, said grasping portion being resilient and acting at its respective ends which are relatively movable to resiliently press said bowed stretches toward each other about said cup, said grasping portion comprising stretches extending respectively upwardly and downwardly from said respective bowed stretches, said upwardly extending stretch coacting with the bead of said cup and said downwardly extending stretch extending up and down alongside said cup for contact with the body of said cup.

5. In combination with a heat-insulated vessel having a threaded mouth, a cap therefor having a rolled thread at its mouth forming threads at the inside and at the outside of said cap and arranged for inversion for use as a cup, said inner threads coacting with the threads of said mouth of said vessel, and a releasable handle for said cup formed of wire of uniform cross-section and having a median portion forming a grasping portion and laterally extending portions extending from the respective sides of said grasping portion and arranged in a helical line with relation to said grasping portion for coaction with said outer thread of said cup, and arranged to be received in a groove or grooves of said outer thread.

In testimony whereof, I have hereunto signed my name in the presence of two subscribing witnesses.

GEORGE P. ALTENBERG.

Witnesses:
THERESA M. SILBER,
WALTER D. MURPHY.